United States Patent Office 3,719,498
Patented Mar. 6, 1973

3,719,498
SAUSAGE ANALOG PROCESS
Harold T. Leidy, New City, N.Y., Charles M. Kerrigan, Wayne, N.J., and Robert T. Tewey, Dobbs Ferry, and Louis Bartenbach, Thornwood, N.Y., assignors to General Foods Corporation, White Plains, N.Y.
No Drawing. Continuation-in-part of application Ser. No. 65,716, Aug. 20, 1970. This application Dec. 29, 1970, Ser. No. 102,549
Int. Cl. A23l *1/20*
U.S. Cl. 99—17    4 Claims

ABSTRACT OF THE DISCLOSURE

A meat analog is formed from a protein gel precursor that has incorporated frozen non-rendered animal fatty tissue prior to a heating operation which causes gelation of the vegetable protein.

RELATED CASE

This invention is a continuation-in-part of Serial No. 65,716, filed Aug. 20, 1970.

BACKGROUND OF THE INVENTION

This invention is directed to the formation of meat analogs wherein a heat set vegetable protein is formulated to substitute for a proteinaceous meaty material. In the invention of the disclosure, an analog, a sausage-type product is made that resembles a meat composition that is formed from ingredients processed into an emulsion system. Additionally, meat cuts generally may be resembled in the analog system.

Extensive development has been undertaken in recent years to formulate meat substitutes from vegetable materials that are concentrated in protein. By appropriate processing steps and with different formulations, a source of vegetable protein may be substituted for a proteinaceous meaty material.

Boyer, U.S. Pat. No. 2,682,466, patented June 29, 1954 teaches the formation of synthetic meat products employing quantities of vegetable protein filaments. These protein filaments are made by forcing a colloidal protein dispersion through a porous membrane, such as a spinneret, into a coagulating bath causing precipitation in filament form. The filaments are assembled into a meat-like product by employing binding materials including cereals and protein. The product may resemble filet mignon, turkey or chicken.

Anson and Pader, holders of numerous U.S. patents, including U.S. Pat. Nos. 2,802,737, 2,802,024, 2,813,025, 2,830,902 and 2,833,651, patented in either 1957 or 1958, disclose protein containing products resembling meat, These patentees teach formation of a "chewy protein gel" wherein various techniques to form meat-like products are taught. The chewy protein gel is made by adjusting a gel precursor such as soy or peanut concentrates to a pH of above 6.0 followed by heating to convert to the chewy protein gel. Various additives including protein filaments, flavoring ingredients, etc., may be incorporated in the synthetic meat products.

Kjelson, U.S. Pat. No. 3,343,963 patented Sept. 26, 1967 teaches formation of high protein food products resembling chopped ground meats. A source of spun edible protein fibers is bound together with a binder consisting of albumen, gluten and particulate oilseed material. The composition is heat set to form the simulated meat product.

More recently, Hartman, U.S. Pat. No. 3,320,070 patented May 16, 1967 has taught manufacture of bacon-like products from man-made fibers of natural vegetable protein with a binder including albumen and an edible proteinate. The bacon-like product is formulated with lean and nonlean portions so that the real meat product is resembled.

SUMMARY OF THE INVENTION

The present invention is considered to be an improvement over Ser. No. 65,716, filed Aug. 20, 1970 which was specific to the formation of sausage analogs. The technique disclosed herein may be employed for all types of meat analogs wherein a proteinaceous vegetable gel is employed to substitute and replace meat protein.

The present technique may be employed to make products resembling a wide variety of meat constituents such as those derived directly from animals or meat product processed into a sausage type food.

The required constituent in the manufacture of the disclosed food is a concentrated source of vegetable protein with an additional component of a non-rendered animal fatty tissue. The protein source, together with water, is processed into a gel system by the application of heat. The formation of the gel system from the vegetable proteinaceous material is a necessary part of this disclosure. The gel form is considered permanent, that is, in normal food use including refrigeration and warming to heat temperature, the formed product will retain its shape. It has been additionally found that for a high degree of juiciness coupled with bounce qualities, a non-rendered animal fatty tissue is essential.

As in Ser. No. 65,716, the invention employs another required constituent in a source of non-rendered animal fatty tissue which is mixed into the vegetable protein gel precursor. The present disclosure employs a further requirement in that the fatty tissue must be frozen at the time it is mixed with the vegetable protein gel precursor.

In the formation of sausage analogs, an additional non-vegetable gel source of proteinaceous material may be employed from gel precursors of albumen, casein and whey. The gel system product by the combination of materials is considered to be superior from consumer considerations.

The present sausage analogs may have various additives blended in the gel precursor prior to the heat operation. Included as suitable ingredients are flavors, starches, emulsifiers, coloring materials, gums and other proteinaceous materials such as gelatin, which complete and balance the analog.

DETAILED DESCRIPTION OF THE INVENTION

The meat analogs made by the present invention resemble and duplicate in essential physical and taste characteristics a wide variety of meat products. The present meat analogs may resemble specific meat cuts from an animal such as bacon, steak, pork chops, etc., as well as meat systems that have been reprocessed and reformulated with other components as in a sausage product.

As employed herein, a meat analog is used as in its normal definition in that the formed product resembles a meat product yet is entirely distinct therefrom in its source materials. Meat products with filler components lie outside the scope of an analog since the filler is employed only as an extender without forming a new product. In contrast, the vegetable proteinaceous material is formulated to resemble the meat source in essential characteristics.

An analog resembling natural meat cuts may be considered to be a system with a substantial amount of fibers bound together in a matrix.

In contrast, a sausage or sausage analog is not considered to resemble natural meat cuts. A sausage analog is formulated and processed so as to duplicate as closely as possible meat products that are initially formed into an emulsion system. The meat emulsion is heated which results in gelation introducing a degree of rigidity. The initial meat emulsion with the water component has flow characteristics so that it may be readily shaped, as in a casing, prior to the gelation to a stable, physical form. Examples of such sausages are bologna, olive loaf, frankfurters, etc.

A vegetable proteinaceous gel material of the analog may serve as a binding system in natural meat cut analogs and be dispersed in non-uniform quantities throughout employed fibers. The vegetable gel may be present with a degree of uniformity throughout the food as in sausage analog, and the vegetable gel precursor may be considered to be the analog counterpart of the meat emulsion.

Problems have arisen in formulation of the gel precursor since after the heat set operation dryness of this constituent has arisen. This dryness quality has limited the flexibility of the gel since, for example, adding more water prior to gelation does not directly solve the problem.

As in Ser. No. 65,716, the required constituent in the present invention in addition to the vegetable protein gel precursor is a source of non-rendered animal tissue. It has been found that if unfrozen rendered fat or vegetable oil is employed, the use of the vegetable protein, particularly an oilseed protein as soy, apparently acts as an emulsifier and ties the fat or oil into the composition. Thus, when the product is eaten even substantial levels of fat and water tend to result in a product with a degree of dryness. In contrast, non-rendered animal fatty tissue possesses a cellular structure. Even with the fatty tissue finally ground, the cellular structure remains. Upon mixing with the components of the meat analog, this non-rendered fatty tissue has a quality of remaining as a distinct entity. Upon heating to cause gelation of the protein gel precursor, the initial non-rendered fatty tissue will remain as a distinct entity thus giving concentrations of this fatty component throughout the product.

The present technique employs the added requirement that the non-rendered animal fatty tissue must be in a frozen state at the time of mixing into the gel precursor. The cellular structure of the non-rendered fatty tissue controls the apparent emulsification of the fatty tissue by the vegetable protein gel precursor. However, it is possible to obtain some added increase in juiciness qualities by the use of frozen non-rendered fatty tissue. The use of non-rendered fatty tissue in an unfrozen state adds a significant increase in juiciness characteristics over the use of an unfrozen rendered fat or vegetable oil. The cellular structure of the non-rendered tissue inhibits to a great extent the apparent emulsification. However, frozen fatty tissue adds an additional increase in juiciness that is small but organoleptically measurable. Therefore, the use of frozen non-rendered animal tissue apparently further inhibits emulsification during the mixing step.

The distribution of non-rendered fat present in the final gel product may be controlled by the particle size of the frozen fat at the time of introduction into the vegetable protein gel precursor. If small pockets of fat are desired, fine grinding will take place. If layers of fat as in bacon or a steak-type product are desired, relatively large blocks of the frozen tissue will be mixed into the gel precursor.

The fatty tissue content will vary depending upon the type of meat analog produced. In the case of a sausage analog, fatty tissue contents of 5 to 30% by weight are acceptable.

The vegetable proteinaceous material employed in the present invention is defined to have the characteristic and quality that upon heating in a water carrier, gelation to a stable, physical form occurs. As in typical gel systems, a degree of rigidity is introduced which is coupled with elasticity and resilience. Ordinarily, the protein content based on the weight of the protein vegetable material will be above about 30% based desirably above 60%, which is based on the solids content. No upper limit on the maximum protein content exists, and protein concentrations about 95% are satisfactory and desirable.

A gel as employed herein is employed in its normal definition, that is, solid or semi-solid system in colloidal dimensions in a carrier liquid which is preferably water. The sources of vegetable protein in the gel may be derived from a wide variety of vegetable material as, for example, defatted oilseeds, and may include soy, peanuts, cottonseed, peas, etc. The vegetable protein is in concentrated form and is preferably bland and, in the case of soy, unwanted flavors are removed. Concentrated protein materials are readily available in commercial form such as isolates, concentrates and flour.

A necessary component is water, since in order for the gel to form this material must be present. The total water content in the product prior to gelation may vary since a large portion of the analog may comprise fibers or fillers. Additionally, the water content of the final product will be determined by the type of meat product that is to be duplicated by the analog system. For example, in the sausage analog a dry intermediate or wet sausage may be duplicated. In this latter class of products, water contents of 42 to 74% have been found acceptable with an optimum range of 52 to 65% by weight. However, these percentage figures are not considered to be limiting, since the amount of mixture in the product is considered to be a wide variety of variable governed by consumer acceptance of the final analog.

In the formation of the gel constituent, satisfactory results occur when the primary gel component is derived from the vegetable protein material. However, with a sausage analog superior results have been found to take place when at least an additional non-vegetable source of protein is employed which also gels upon heating. These sources of protein are albumen, casein and whey or combinations thereof, and yield a product that is considered to be a high quality gel system. In duplicating a sausage, the concentrations by weight of the gelable constituents, namely the vegetable protein material in conjunction with the albumen, casein, whey and combinations, are critical if the final product is to possess a superior gel system. Since the concentration of vegetable material may vary depending on the degree of refinement, the critical ratio of materials is given on the basis of the protein content of the vegetable material.

The minimum concentrations of vegetable protein to albumen, casein and whey would be of the order of about 3.4:1, 5:3 and 1:1, respectively. With combinations of albumen, casein and whey, the minimum concentration of vegetable material is intended to encompass a weighted total of these added gel precursors. The maximum vegetable protein concentration to these added gel components will be of the order of about 40:1.

When using component combinations of vegetable proteinaceous material with the added albumen, casein and whey, it is desirable that uniformity of these components be obtained prior to the gelation conditions. Non-uniformity of the gels may be obtained and an acceptable product can be realized, however, a superior gel system is considered to be obtained when uniformity in mixing is obtained.

The conditions of gelation are obtained merely by heating which brings about the desired result. Elevated temperatures preferably in the range of 150° F. to about 300° F. will cause the gel to form. Minimum temperatures will cause longer gel times, while excessive temperatures will cause gelation but will additionally result in some protein degradation. Optimum gelation temperatures are considered to lie above the boiling point of water in autoclaving techniques wherein elevated pressure is satisfactorily employed. To complete the desired flavor characteristics and appearance of the meat analog, flavored spices and coloring components are highly desirable. These constituents may be mixed in either the gel precursor or they may be separately added to the final gel as well as the combination of both of these techniques.

To further illustrate the innovative aspects of this invention, the following examples are provided:

Example 1

To form a frankfurter-type analog, the following constituents were employed:

| | Percent |
|---|---|
| Soy isolate (30% solids) | 43.1 |
| Wheat gluten/soy grits/flour mixture (expanded filler with ammonium carbonate) (30% solids) | 21.1 |
| Water | 14.0 |
| Beef suet | 13.5 |
| Soybean oil | 1.5 |
| Albumen | 1.0 |
| Seasoning/flavor/color | 5.8 |

The expanded filler material is a high protein constituent containing wheat gluten/soy grits/flour. This expanded filler is made by mixing the source constituents with a water concentration of about 25%. Ammonium carbonate at a concentration of about 0.6% is employed since this material increases the expansion effect during the processing. The residual ammonium carbonate concentration will approach 0%. The constituents are fed into an inlet of a heated Model X–25 Wenger Extruder wherein the mix is subjected to elevated temperature and pressure by a revolving screw in the extruder barrel. The constituents are extruded through two ⅜-inch diameter dies with a recorded pressure of approximately 150 p.s.i.g. and a temperature of approximately 325° F. at the die face. The material is soaked and excess water is removed to give a final solids content of 30%, and the material is comminuted prior to subsequent mixing with the component.

The soy isolate, which is a pH of 6.2 and is at a concentration of 30% solids, is blended with the soy grits/wheat gluten/flour as well as with water, albumen, seasoning flavor and color in a precooled Hobart Silent Cutter (at 35° F.). The water added is sufficient to permit the ingredients to be blended uniformly with comminution.

The beef suet in a frozen state is finely ground in a Hobart Silent Cutter. The beef suet in an unfrozen state is added to the Hobart Cutter and mixed with all other ingredients to obtain homogeneity.

The product was cased, linked and heat set in a pressure cooker at an elevated temperature at 10 p.s.i.g. for 10 minutes.

Example 2

The process of Example 1 was repeated except an equal weight of frozen beef suet replaced the unfrozen beef suet when the total composition is mixed.

Example 3

The process of Example 1 was repeated except rendered beef tallow in an unfrozen condition replaced an equal weight of beef suet.

A composition of the final warmed products of Examples 1, 2 and 3 gave the results that the Examples 1 and 2 produce a high quality frankfurter analog with Example 3 being organoleptic evaluated of decreased quality. Examples 1 and 2 gave a ready juice release upon being mechanically squeezed, while Example 3 gave essentially little or no liquid release. Fat packets were visually evident in Examples 1 and 2 contrary to a visual inspection of Example 3. An evaluation between Examples 1 and 2 gave the result that Example 2 was of higher quality, since the product gave an additional amount of juiciness over Example 1.

From the foregoing description of specific embodiments of the present invention, numerous modifications and alterations will become readily apparent to those skilled in the art, and it is intended that such be included within the scope of the present invention.

What is claimed is:

1. A method of forming a food product which resembles meat products prepared from meat emulsions, comprising:
   (a) uniformly blending together
      (1) a gel precursor consisting of a vegetable protein and a material selected from the group consisting of albumen, casein, whey, and mixtures thereof, said vegetable protein being present above about 30% by weight of the gel precursor and wherein the minimum weight ratio of the vegetable protein to albumen, casein, and whey is in the range from about 3.4:1, 5:3, and 1:1, respectively, or a weighted total for mixtures thereof and wherein the maximum weight ratio of vegetable protein to albumen, casein, whey or combinations is about 40:1,
      (2) a frozen non-rendered fatty tissue in an amount ranging from about 5% to about 30% by weight of the total blend,
      (3) water, in an amount ranging from about 42% to about 74% by weight of the total blend,
      (4) a filler material in the form of particles of an expanded high protein source mixture of wheat gluten, soya grits and flour, and
      (5) small but effective amounts of flavorings, spices, and coloring components to impart to the blend a taste and color similar to those of a meat product prepared from meat emulsions;
   (b) shaping the mixture of (a) to a desirable form; and
   (c) heating the shaped mixture to set the gel to a stable physical form,
whereby the heat-set gel resembles a meat product prepared from meat emulsions in appearance, flavor and texture.

2. The method of claim 1 wherein said frozen non-rendered fatty tissue is in particulate form.

3. The method of claim 1 wherein said frozen non-rendered fatty tissue comprises suet.

4. The method of claim 1 wherein said frozen non-rendered fatty tissue comprises beef suet.

References Cited

UNITED STATES PATENTS

| 2,802,737 | 8/1957 | Anson | 99—14 |
| 2,813,025 | 11/1957 | Anson | 99—14 |

RAYMOND N. JONES, Primary Examiner

R. B. ANDEWELT, Assistant Examiner

U.S. Cl. X.R.

99—109